(12) United States Patent
Sato

(10) Patent No.: US 7,099,381 B2
(45) Date of Patent: Aug. 29, 2006

(54) DE-SPREADING METHOD AND DE-SPREADING APPARATUS

(75) Inventor: Takaharu Sato, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 820 days.

(21) Appl. No.: 10/130,478

(22) PCT Filed: Sep. 26, 2001

(86) PCT No.: PCT/JP01/08360

§ 371 (c)(1),
(2), (4) Date: May 20, 2002

(87) PCT Pub. No.: WO02/27993

PCT Pub. Date: Apr. 4, 2002

(65) Prior Publication Data

US 2002/0172268 A1    Nov. 21, 2002

(30) Foreign Application Priority Data

Sep. 26, 2000 (JP) ............................. 2000-291752
Sep. 26, 2000 (JP) ............................. 2000-291753
Sep. 26, 2000 (JP) ............................. 2000-291754

(51) Int. Cl.
*H04B 1/69* (2006.01)
*H04B 1/707* (2006.01)
*H04B 1/713* (2006.01)

(52) U.S. Cl. .................................................... 375/150

(58) Field of Classification Search ................. 375/150
See application file for complete search history.

(56) References Cited

U.S. PATENT DOCUMENTS

| | | | |
|---|---|---|---|
| 4,404,645 A | | 9/1983 | Elings et al. |
| 5,081,643 A | | 1/1992 | Schilling |
| 5,870,378 A | * | 2/1999 | Huang et al. ................ 370/209 |
| 5,910,948 A | * | 6/1999 | Shou et al. .................. 370/335 |
| 6,389,060 B1 | * | 5/2002 | Naruse ........................ 375/130 |
| 6,693,954 B1 | * | 2/2004 | King et al. .................. 375/147 |
| 6,724,810 B1 | * | 4/2004 | Chapman ..................... 375/150 |

FOREIGN PATENT DOCUMENTS

| | | |
|---|---|---|
| EP | 1 215 835 A1 | 6/2002 |
| JP | U 3-27144 | 3/1991 |
| JP | A 9-284178 | 10/1997 |
| JP | A 2000-101477 | 4/2000 |
| JP | A 2000-134181 | 5/2000 |
| JP | A 2001-69033 | 3/2001 |
| JP | A 2001-251214 | 9/2001 |
| JP | A 2001-274728 | 10/2001 |

* cited by examiner

*Primary Examiner*—Chieh M. Fan
*Assistant Examiner*—Jia Lu
(74) *Attorney, Agent, or Firm*—Oliff & Berridge, PLC.

(57) ABSTRACT

The present invention relates to a de-spreading method and a de-spreading apparatus, in which an correlation operation between input signals time-sequentially inputted and a pre-determined code is performed so that data suitable for the code is extracted from the input signals. An object of the present invention is to reduce the circuit scale and the dissipation power. The de-spreading apparatus has a delay circuit for delaying the input signal relatively with respect to the synchronization detecting code to generate a delay signal, and an correlation circuit (the arithmetic operating unit 183, the adder 184, the registers 186E, 186P and 186L, etc.) for performing three correlation operations (Early), (Punctual) and (Late) between the input signal or the delay signal selected in accordance with the three correlation operations E, P and L, and the synchronization detecting code on a time division basis.

8 Claims, 13 Drawing Sheets

DE-SPREADING METHOD AND DE-SPREADING APPARATUS

TECHNICAL FIELD

The present invention relates to a de-spreading method and a de-spreading apparatus, in which an correlation operation between time-sequential input signals and predetermined codes is performed so that data suitable for the codes is extracted from the input signals.

Background Art

Recently, a system called CDMA (Code Division Multiple Access) has been paid to attention as one of the communication technologies used in cellular phones and the like. The CDMA system is a system in which an correlation operation between transmitted signals by a communication and predetermined codes is performed so that desired data are extracted from the transmitted signals. This CDMA system features that a greater number of persons can simultaneously speak compared to the conventional FDMA (Frequency Division Multiple Access) system and TDMA (Time Division Multiple Access) system.

This CDMA uses a technology called a spectrum spreading. In order to decode data from signals modulated in accordance with the CDMA system, a technology called a de-spreading is used.

FIG. 1 is a circuit block diagram showing a de-spreading apparatus.

A received signal received by an antenna and the like is pre-processed and then supplied as an input signal S of the de-spreading apparatus shown in FIG. 1, to a plurality of data de-spreading circuits 11_0, 11_1, 11_2, . . . , and three synchronization maintaining (DLL) de-spreading circuits 12, 13 and 14. The data de-spreading circuits 11_0, 11_1, 11_2, . . . are needed as much as the data multipled.

Hereinafter, first, how the DLL de-spreading circuits 12, 13 and 14 works is described.

Each of the DLL de-spreading circuits 12, 13 and 14 performs an correlation operation between the input signal and a synchronization detecting code. The DLL de-spreading circuit (P) 13 performs an correlation operation between the input signal at the present receive (punctual) timing and the synchronization detecting code. The DLL de-spreading circuit (L) 14 performs an correlation operation between the input signal in a delay (late) timing relatively delayed than the present receive (punctual) timing with respect to the synchronization detecting code and the synchronization detecting code. The DLL de-spreading circuit (E) 12 performs an correlation operation between the input signal in an advance (early) timing relatively advanced than the present receive (punctual) timing with respect to the synchronization detecting code and the synchronization detecting code.

When the present receive timing is a proper receive timing, of the three DLL de-spreading circuits 12, 13 and 14, an correlation operation result (a correlation value) by the DLL de-spreading circuit (P) 13, which performs an correlation operation between the input signal in the present receive timing and the synchronization detecting code, is larger than that of the other two DLL de-spreading circuits (E, L) 12 and 14. When the present receive timing is later than the proper receive timing, an correlation operation result (a correlation value) by the DLL de-spreading circuit (L) 14, which performs an correlation operation between the input signal in the late timing and the synchronization detecting code, is larger than that of the other two DLL de-spreading circuits (E, P) 12 and 13. Likely, when the present receive timing is earlier than the proper receive timing, a correlation value by the DLL de-spreading circuit (E) 12, which performs an correlation operation between the input signal in the early timing and the synchronization detecting code, is larger than that of the other two DLL de-spreading circuits (P, L) 13 and 14. That is, through comparison of the correlation values by the three DLL de-spreading circuits 12, 13 and 14 with one another, it is detected whether the present receive timing is to be maintained, to be advanced, or to be delayed.

Based on the three correlation values calculated at the three de-spreading circuits 12, 13 and 14, the timing of the largest correlation value of the three timings, punctual, early and late, is set as a next receive timing at the timing generation circuit 15 shown in FIG. 1. Then the timing generation circuit 15 generates timing signal suitable for the set up receive timing. Thus, there is always established a synchronization with the receive signal (input signal).

On the other hand, each of the plurality of data de-spreading ciruits 11_0, 11_1, 11_2, . . . shown in FIG. 1 performs an correlation operation between an input signal in the present receive timing and a data extracting code according to data intended to be extracted from the input signal, so that a desired data is extracted from the input signal. However, the extracted data is subjected to various distortions in the communication paths. Thus, data extracted in the data de-spreading circuits 11_0 11_1, 11_2, . . . are fed to channel estimation circuits 16_0, 16_1, 16_2, . . . , respectively, so that the channel estimation circuits 16_0, 16_1, 16_2, . . . detect a degree of variation in amplitude and variation (rotation) in phase subjected by the communication paths. The extracted data are fed to de-rotation circuits 17_0, 17_1, 17_2 . . . , respectively. In the de-rotation circuits 17_0, 17_1, 17_2 . . . , the data extracted in the data de-spreading circuits 11_0, 11_1, 11_2, . . . are subjected to restoration (de-rotation) of the corresponding variations in amplitude and in phase detected in the channel estimation circuits 16_0, 16_1, 16_2, . . . , so that exact data are restored. However, the data outputted from the de-rotation circuits 17_0, 17_1, 17_2 . . . are not complete, and thus thereafter are subjected to error corrections by error correction circuits (not illustrated) to restore to the original state. It is acceptable that one channel estimation circuit is used and the extracted data from the single channel estimation circuit is fed to the respective de-rotation circuits.

FIG. 2 shows the operation timings of the three DLL de-spreading circuits (E, P, L) 12, 13 and 14.

FIG. 2(A) shows an input signal wherein time units referred to as 'chips' are used, and marks D0, D1, and D2 are applied for each chip in the earlier order on a time basis.

FIG. 2(B) shows a time sequence of a synchronization detecting code wherein phases (N−1), N and (N+1) are applied for each chip in the earlier order on a time basis.

FIG. 2(C) shows a time sequence of a synchronization detecting code, which is the same as one wherein the synchronization detecting code shown in FIG. 2(B) is advanced by ½ chip time. In other words, in the event that the synchronization detecting code is taken as a standard, the input signal (FIG. 2(A)) is delayed relatively by ½ of one chip.

FIG. 2(D) shows a time sequence of a synchronization detecting code, which is the same as one wherein the synchronization detecting code shown in FIG. 2(B) is delayed by ½ chip time. In other words, in the event that the synchronization detecting code is taken as a standard, the input signal (FIG. 2(A)) is advanced relatively by ½ of one chip.

In this manner, the three synchronization detecting codes, which are mutually shifted on a time basis, are generated. Of the three DLL de-spreading circuits (E, P, L) 12, 13 and 14 shown in FIG. 1, the DLL de-spreading circuit (P) 13 performs a first arithmetic operation (an arithmetic operation as to the phase N) for an correlation operation between the input signal in FIG. 2 (A) and the synchronization detecting code of the timing shown in FIG. 2 (B) in the timing indicated by the mark 'P' in FIG. 2. The DLL de-spreading circuit (L) 14 performs an arithmetic operation as to the phase (N) for an correlation operation between the input signal in FIG. 2 (A) and the synchronization detecting code of the timing shown in FIG. 2 (D) in the timing indicated by the mark 'L' in FIG. 2. The DLL de-spreading circuit (E) 12 performs an arithmetic operation as to the phase (N+1) for an correlation operation between the input signal in FIG. 2 (A) and the synchronization detecting code of the timing shown in FIG. 2 (C) in the timing indicated by the mark 'E' in FIG. 2.

The correlation operation performs an arithmetic operation using multipliers or selectors or the like to determine accumulation of the operational results in a plurality of continuous phases. In each of the DLL de-spreading circuits 12, 13 and 14, the arithmetic operations in each chip are performed, and the operational results are accumulated in the plurality of continuous chips, so that an correlation operational result (correlation value) can be obtained.

In a de-spreading apparatus 10 shown in FIG. 1, the three DLL de-spreading circuits 12, 13 and 14 and the data de-spreading circuits 11_0, 11_1, 11_2, . . . are used according to the multiplicity of data. Also the channel estimation circuits 16_0, 16_1, 16_2, . . . and the de-rotation circuits 17_0, 17_1, 17_2 . . . , are needed in accordance with the multiplicity of data. In addition, in case of the CDMA, there is a plurality of transmission paths from a base station to a mobile station. In order to obtain information of the plurality of transmission paths, the whole circuit structure shown in FIG. 1 is needed for each transmission path. Thus, this has a great effect on a circuit scale. A dissipation power substantially increases in accordance with the circuit scale, thus, when a large scale de-spreading apparatus is mounted on for example a portable terminal, the dissipation power also will become a great problem.

DISCLOSURE OF THE INVENTION

In view of the foregoing, the object of the present invention is to provide a de-spreading method capable of contributing to reduce the circuit scale and a de-spreading apparatus capable of contributing to reduce the circuit scale.

To achieve the above-mentioned object, the present invention provides a de-spreading method in which an correlation operation between input signals time-sequentially inputted and a predetermined code is performed so that data suitable for the code is extracted from the input signals.

First, an input signal is delayed relatively with respect to a code so that a delayed signal is generated.

Next, three correlation operations are performed. A first correlation is an correlation operation between an input signal in a predetermined receive timing and a synchronization detecting code. A second correlation operation is an correlation operation between an input signal in a late timing relatively more delayed than the receive timing with respect to a synchronization detecting code and the synchronization detecting code. A third correlation operation is an correlation operation between an input signal in early timing relatively more advanced than the receive timing with respect to a synchronization detecting code and the synchronization detecting code. The input signal or its delayed signal is selected in one chip on a time division basis in accordance with the respective correlation operation, and this selection is repeated over a plurality of chips.

The first to the third unit operations are arithmetic operations in a chip for the first to the third correlation operations between the input signal or its delayed signal selected in accordance with the first to the third correlation operations and the synchronization detecting code. The first to the third unit operations are performed on a time division basis in one chip and are performed repeatedly over a plurality of chips. Results of the arithmetic operations of the first to the third unit operations, which are obtained through the repetition, are accumulated on the first to the third unit operations in a plurality of continuous chips, so that the first to the third correlation operations are performed.

When the first to the third correlation operations are performed in the manner as mentioned above, the timing of the largest correlation value among the receive timing, the late timing and the early timing, is set up as the subsequent receive timing in accordance with the results of the first to the third correlation operations.

In the above-mentioned de-spreading method, it is preferable that the delayed signal is generated in such a manner that the input signal is delayed by a time of 1/N of one chip where N=integer.

To achieve the above-mentioned object, the present invention provides a de-spreading apparatus in which an correlation operation between input signals time-sequentially inputted and predetermined codes is performed so that data suitable for the code is extracted from the input signals, the de-spreading apparatus comprising:

an correlation operating unit for performing a first correlation operation that is an correlation operation between an input signal in a predetermined receive timing and a synchronization detecting code, a second correlation operation that is an correlation operation between an input signal in a late timing relatively more delayed than the receive timing with respect to a synchronization detecting code and the synchronization detecting code, and a third correlation operation that is an correlation operation between an input signal in an early timing relatively more advanced than the receive timing with respect to a synchronization detecting code and the synchronization detecting code; and a timing generation section for setting up a timing of the largest correlation value among the receive timing, the late timing and the early timing, as a subsequent receive timing in accordance with the results of the first to the third correlation operations in the correlation operating unit and generating a timing signal suitable for the receive timing, wherein the correlation operating unit comprises:

a delay circuit for delaying the input signal relatively with respect to the synchronization detecting code to generate a delayed signal, and an correlation circuit for performing the first to the third correlation operations between the input signal or its delayed signal and the synchronization detecting code on a time division basis, the signals are selected in accordance with the first to the third correlation operations.

In the de-spreading apparatus according to the present invention as mentioned above, it is acceptable that the correlation circuit comprises:

an arithmetic operation unit for performing the first to the third unit operations that are arithmetic operations for the first to the third correlation operations between the input signal or its delayed signal and the synchronization detecting code, on a time division basis in one chip as a unit of time, the signals are selected in accordance with the first to the third correlation operations;

first to third registers for storing results still in progress of the first to the third correlation operations, respectively; and an adder for adding operational results of the first to the third unit operations to stored values of the first to the third registers and restoring them into the first to the third registers respectively on a time division basis in the one chip, so as to obtain accumulation of the operational results of the first to the third unit operations over a plurality of continuous chips.

In the de-spreading apparatus according to the present invention as mentioned above, it is preferable that the delay circuit delays the input signal by a time of 1/N of one chip where N=integer.

According to the de-spreading method and the de-spreading apparatus of the present invention, the first to the third correlation operations are performed on a time division basis, and thus only one DLL de-spreading circuit can be used, as compared with the prior art in which three DLL de-spreading circuits are basically needed as shown in FIG. 1. Thus, it is possible to greatly reduce the circuit scale.

Further to achieve the above-mentioned object, the present invention provides a second de-spreading method in which an correlation operation between input signals time-sequentially inputted and a predetermined code is performed so that data suitable for the code is extracted from the input signals.

First, an input signal is relatively delayed with respect to a code so that a delayed signal is generated.

Next, there are performed a first correlation operation that is an correlation operation between an input signal in a predetermined receive timing and a synchronization detecting code, a second correlation operation that is an correlation operation between an input signal in a late timing relatively more delayed than the receive timing with respect to a synchronization detecting code and the synchronization detecting code, a third correlation operation that is an correlation operation between an input signal in an early timing relatively more advanced than the receive timing with respect to a synchronization detecting code and the synchronization detecting code, and a fourth correlation operation that is an correlation operation between an input signal in the receive timing and a data extracting code. The input signal or its delayed signal is selected in one chip on a time division basis in accordance with the respective correlation operation, and this selection is repeated over a plurality of chips.

The first to the fourth unit operations, which are arithmetic operations in a chip for the first to the third correlation operations between the input signal or its delayed signal selected in accordance with the first to the fourth correlation operation and the synchronization detecting codes, and are arithmetic operations in a chip for the fourth correlation operation between the input signal or the delayed signal and the data extracting code, are performed on a time division basis in one chip and are performed repeatedly over a plurality of chips. Results of the arithmetic operations of the first to the fourth unit operations, which are obtained through the repetition, are accumulated on the first to the fourth unit operations in a plurality of continuous chips, so that the first to the fourth correlation operations are performed.

When the first to the fourth correlation operations are performed in the manner as mentioned above, a timing of the largest correlation value among the receive timing, the late timing and the early timing, is set up as a subsequent receive timing in accordance with the results of the first to the third correlation operations, and data suitable for the data extracting code is extracted.

In the de-spreading method according to the present invention as mentioned above, it is preferable that the delayed signal is generated in such a manner that the input signal is delayed by a time of 1/N of one chip where N=integer.

To achieve the above-mentioned object, the present invention provides a second de-spreading apparatus in which an correlation operation between input signals time-sequentially inputted and a predetermined code is performed so that data suitable for the code is extracted from the input signals, the de-spreading apparatus comprising:

an correlation operating unit for performing a first correlation operation that is an correlation operation between an input signal in a predetermined receive timing and a synchronization detecting code, a second correlation operation that is an correlation operation between an input signal in a late timing relatively more delayed than the receive timing with respect to a synchronization detecting code and the synchronization detecting code, a third correlation operation that is an correlation operation between an input signal in an early timing relatively more advanced than the receive timing with respect to a synchronization detecting code and the synchronization detecting code, and a fourth correlation operation that is an correlation operation between an input signal in the receive timing and a data extracting code; and a timing generation section for setting up a timing of the largest correlation value among the receive timing, the late timing and the early timing, as a subsequent receive timing in accordance with the results of the first to the third correlation operations, of the first to the fourth correlation operations in the correlation operating unit, and generating a timing signal suitable for the receive timing, wherein the correlation operating unit comprises:

a delay circuit for delaying the input signal relatively with respect to the synchronization detecting code and the data extracting code to generate a delayed signal, and an correlation circuit for performing on a time division basis the first to the fourth correlation operations, wherein the first to the third correlation operations are performed between the input signal or its delayed signal selected in accordance with the first to the fourth correlation operation and the synchronization detecting code, and the fourth correlation operation are performed between the input signal or the delayed signal and the data extracting code.

In the de-spreading apparatus according to the present invention as mentioned above, it is acceptable that the correlation circuit comprises:

an arithmetic operation unit for performing the first to the fourth operations, which are arithmetic operations in a chip for the first to the third correlation operations between the input signal or its delayed signal selected in accordance with the first to the fourth correlation operations and the synchronization detecting code, and an arithmetic operation in a chip for the fourth correlation operation between the input signal or its delayed signal and the data extracting code, on a time division basis in one chip;

first to fourth registers for storing results still in progress of the first to the fourth correlation operations, respectively; and an adder for adding operational results of the first to the fourth operations to stored values of the first to the fourth registers, and restoring them into the first to the fourth registers respectively, on a time division basis in the one chip, so as to obtain accumulation of the operational results of the first to the fourth operations over a plurality of continuous chips.

In the de-spreading apparatus according to the present invention as mentioned above, it is preferable that the delay circuit delays the input signal by a time of 1/N of one chip where N=integer.

To achieve the above-mentioned object, the present invention provides a third de-spreading method in which an correlation operation between input signals time-sequentially inputted and a predetermined code is performed so that data suitable for the code is extracted from the input signals, wherein unit operations each being an arithmetic operation in one chip, in a plurality of correlation operations between an input signal and a plurality of sorts of data extracting codes, are performed on a time division basis and are repeatedly performed over a plurality of chips, and the unit operations obtained through the repetition are accumulated in association with a plurality of sorts of data extracting codes over a plurality of continuous chips, so that a plurality of correlation operations are performed, and a plurality of data that are suitable for a plurality of sorts of data extracting codes are extracted in accordance with the result of the plurality of correlation operations.

To achieve the above-mentioned object, the present invention provides a third de-spreading apparatus in which an correlation operation between input signals time-sequentially inputted and a predetermined code is performed so that data suitable for the code is extracted from the input signals, the de-spreading apparatus comprising:

an correlation operating unit for performing on a time division basis a plurality of correlation operations between the input signals and a plurality of sorts of data extracting codes, and extracting a plurality of sorts of data.

In the de-spreading apparatus according to the present invention as mentioned above, it is acceptable that the correlation operating unit comprises:

an arithmetic operation unit for performing a plurality of correlation operations between the input signal and a plurality of data extracting codes, on a time division basis in one chip as a unit of time;

a plurality of registers for storing results still in progress of the plurality of correlation operations, respectively; and an adder for adding operational results of the plurality of operations to stored values of the plurality of registers, and restoring them into the plurality of registers respectively, on a time division basis in the one chip, so as to obtain accumulation of the operational results of the plurality of operations over a plurality of continuous chips.

According to the third de-spreading method and the third de-spreading apparatus of the present invention, extraction of multiplexed data is performed on a time division basis, and thus the number of data de-spreading circuits can be reduced, as compared with the prior art in which data de-spreading circuits are needed as much as the data multipled as shown in FIG. 1. Thus, it is possible to greatly reduce a circuit scale.

BEST MODE FOR CARRYING OUT THE INVENTION

Embodiments of the present invention will be described hereinafter.

Figure 3:
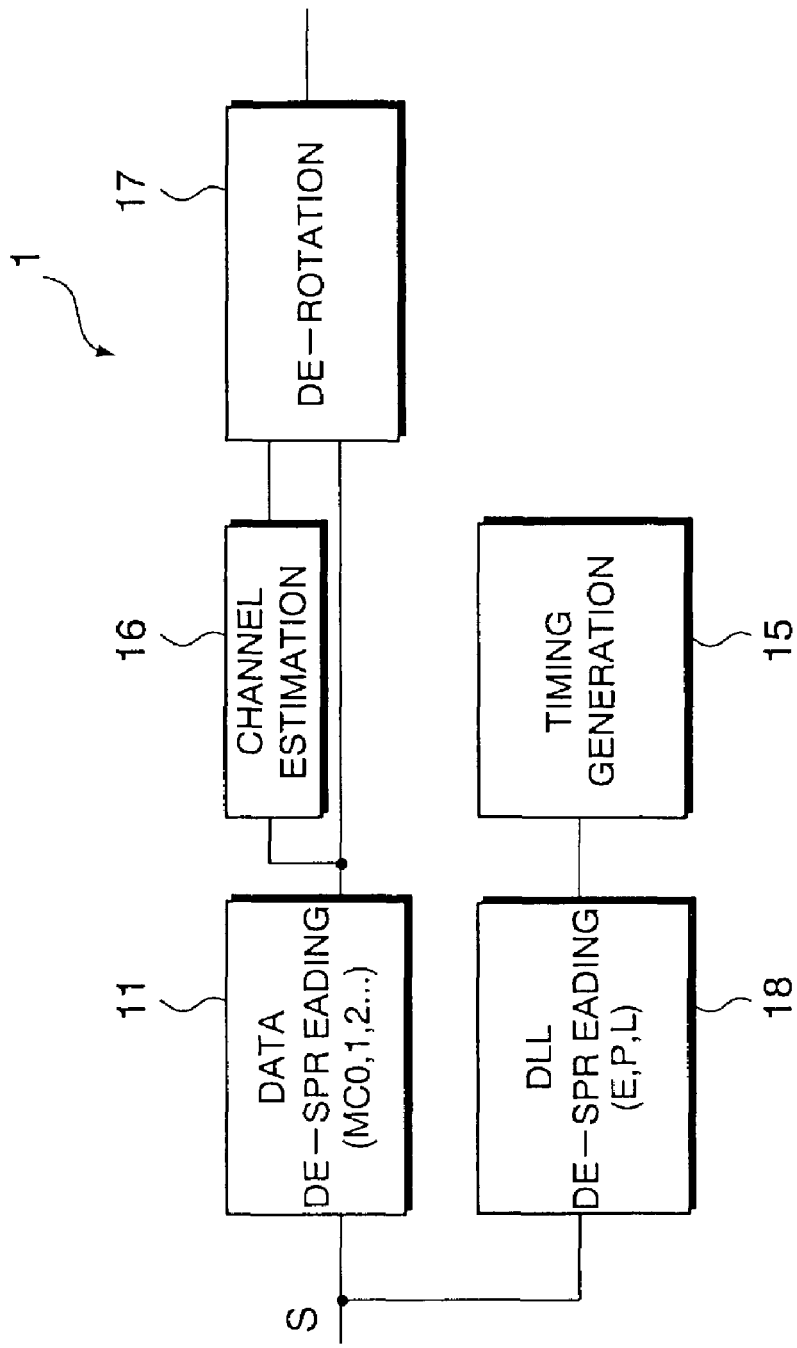
FIG. 3 is a block diagram of a first embodiment of a de-spreading apparatus of the present invention.

FIG. 3 is a block diagram of a first embodiment of a de-spreading apparatus of the present invention. In FIG. 3, the same reference numbers as those of the conventional de-spreading apparatus 10 shown in FIG. 1 denotes the same parts, and only different points will be described hereinafter. A de-spreading apparatus 1 shown in FIG. 3 comprises one data de-spreading circuit 11 and one DLL de-spreading circuit 18, instead of a plurality of data de-spreading circuits 11_0, 11_1, 11_2, . . . and the three DLL de-spreading circuits 12, 13 and 14 shown in FIG. 1, respectively. The data de-spreading circuit 11 implements on a time division basis functions of the plurality of data de-spreading circuits 11_0, 11_1, 11_2, . . . shown in FIG. 1. The DLL de-spreading circuit 18 implements on a time division basis functions of the three DLL de-spreading circuits 12, 13 and 14 shown in FIG. 1.

The de-spreading apparatus 1 shown in FIG. 3 also comprises one channel estimation circuit 16 and one de-rotation circuit 17 for the data de-spreading circuit 11. The channel estimation circuit 16 implements on a time division basis functions of a plurality of channel estimation circuits 16_0, 16_1, 16_2, . . . shown in FIG. 1. The de-rotation circuit 17 implements on a time division basis functions of a plurality of de-rotation circuits 17_0, 17_1, 17_2 . . . shown in FIG. 1.

Hereinafter, first, there will be explained the DLL de-spreading circuit 18, and then the data de-spreading circuit 11.

Figure 4:
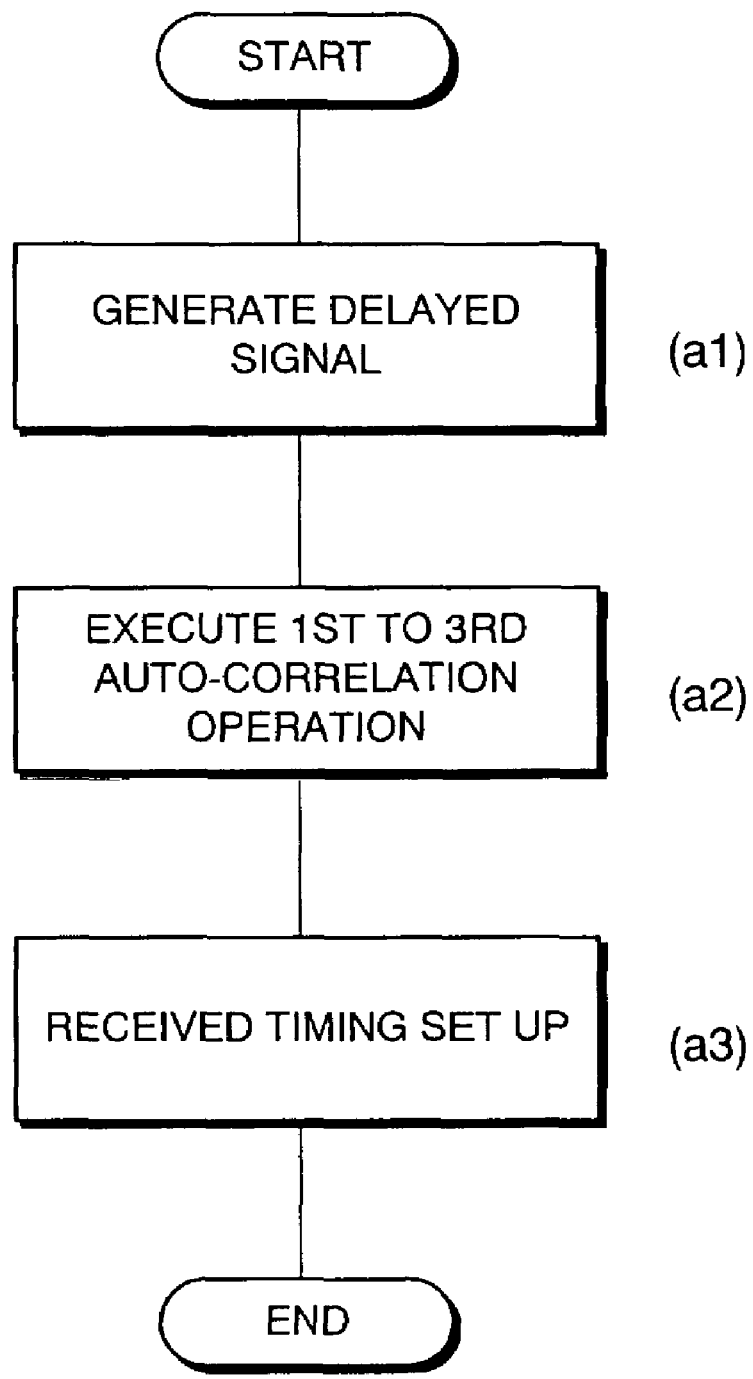
FIG. 4 is a flowchart useful for understanding a first embodiment of a de-spreading method of the present invention.

FIG. 4 is a flowchart useful for understanding a first embodiment of a de-spreading method of the present invention, which is implemented in the de-spreading apparatus shown in FIG. 3.

Here, first, an input signal is delayed relatively with respect to a code so that a delayed signal D is generated (step a1).

Here, the delayed signal is created in such a manner that the input signal is delayed by time of 1/N (integer) of one chip, for example, ¼ of one chip.

Next, there are performed a first correlation operation that is an correlation operation between an input signal in a predetermined receive timing and a synchronization detecting code, a second correlation operation that is an correlation operation between an input signal in a late timing relatively more delayed than the receive timing with respect to a synchronization detecting code and the synchronization detecting code, and a third correlation operation that is an correlation operation between an input signal in an early timing relatively more advanced than the receive timing with respect to a synchronization detecting code and the synchronization detecting code. The input signal or its delayed signal is selected in one chip on a time division basis in accordance with the respective correlation operation, and this selection is repeated over a plurality of chips.

The first to the third unit operations, which are arithmetic operations in a chip for the first to the third correlation operations between the input signal or its delayed signal selected in accordance with the first to the third correlation operations and the synchronization detecting code, are performed on a time division basis in one chip and are performed repeatedly over a plurality of chips. Results of the arithmetic operations of the first to the third unit operations, which are obtained through the repetition, are accumulated on the first to the third unit operations in a plurality of continuous chips, so that the first to the third correlation operations are performed (step a2).

When the first to the third correlation operations are performed in the manner as mentioned above, the timing of the largest correlation value among the receive timing, the late timing and the early timing, is set up as the subsequent receive timing in accordance with the results of the first to the third correlation operations (step a3).

Figure 5:
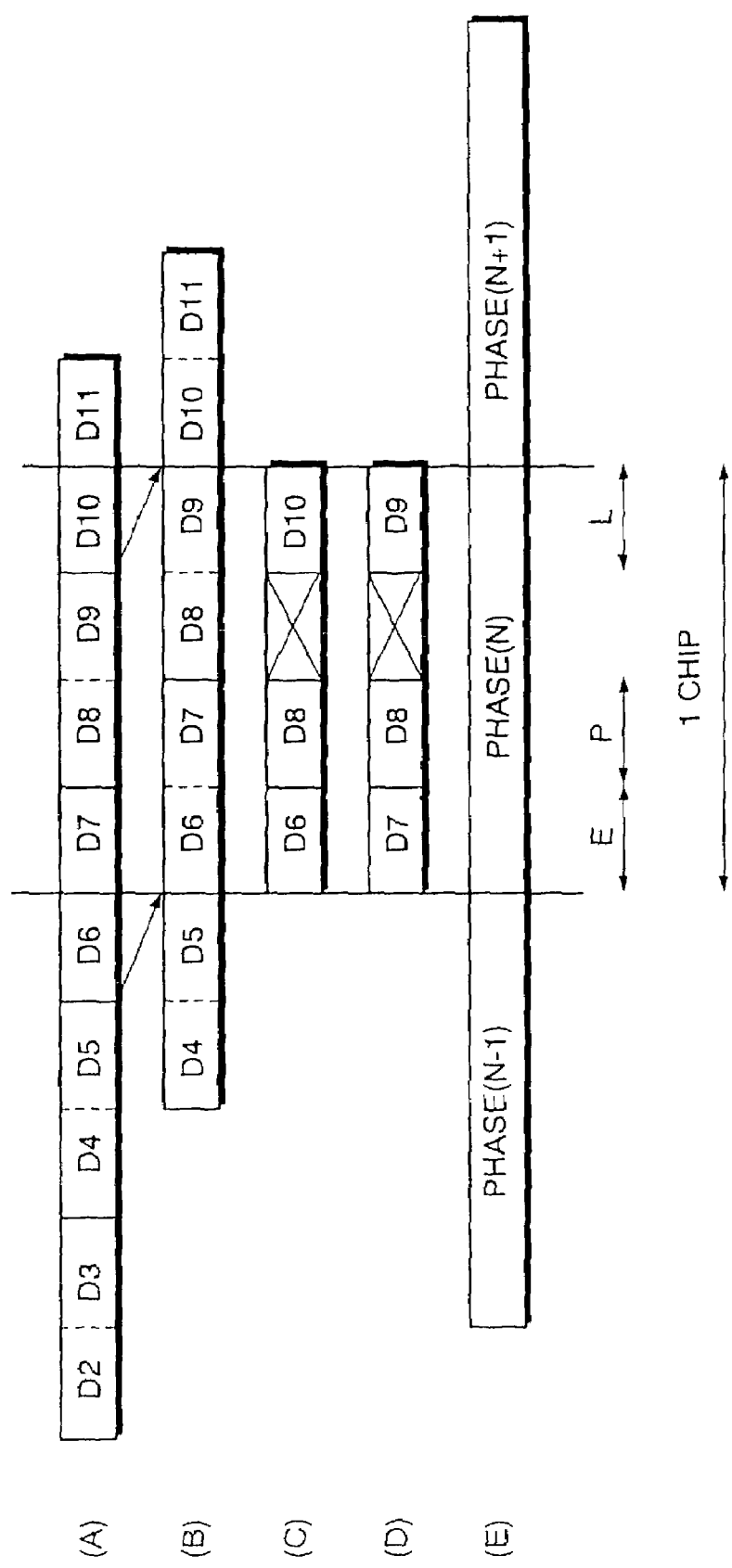
FIG. 5 is an explanatory view useful for understanding operations of the DLL de-spreading circuit shown with a block in FIG. 3.

FIG. 5 is an explanatory view useful for understanding operations of the DLL de-spreading circuit 18 shown with a block in FIG. 3. The step a2 of the flowchart of FIG. 4 will be concretely explained referring to FIG. 5.

FIG. 5(A) shows an input signal. For the input signal shown in FIG. 5(A), marks D2, D3 . . . D11 are applied at intervals of time wherein one chip as a time unit is partitioned into ¼, in the earlier order in time. Marks D7, D8, D9 and D10 are applied for one chip of interest.

FIG. 5(B) shows a delayed signal in which the input signal shown in FIG. 5(A) is delayed by ¼ of one chip.

FIG. 5(C) and FIG. 5(D) show a combination of the input signal shown in FIG. 5(A) and the delayed signal in FIG. 5(B).

FIG. 5(C) shows a combination of signals in which first ¼ time in one chip is the delayed signal D6 in FIG. 5(B), second ¼ time is the input signal D8 in FIG. 5(A), third ¼ time is a don't care (either of the input signal and the delay signal is acceptable), and fourth ¼ time is the input signal D10 in FIG. 5(A).

FIG. 5(D) shows a combination of signals in which first ¼ time in one chip is the input signal D7 in FIG. 5(A), second ¼ time is the input signal D8 in FIG. 5(A), third ¼ time is a don't care, and fourth ¼ time is the delay signal D9 in FIG. 5(B).

As mentioned in the description of the Background Art, the correlation operations for synchronization detection needs three correlation operations, which are an correlation operation between the input signal in the present receive timing and the synchronization detecting code, an correlation operation between the input signal in a late timing relatively more delayed than the present receive timing with respect to the synchronization detecting code and the synchronization detecting code, and an correlation operation between the input signal in an early timing relatively more advanced than the present receive timing with respect to the synchronization detecting code and the synchronization detecting code. However, regarding the time lags of the late timing and the early timing with respect to the receive timing, it happens that those time lags may be set up to ½ time of one chip, or ¼ time of one chip in accordance with a design concept and the like.

The combination of FIG. 5(C) is effective in the event that the time lags of the late timing and the early timing with respect to the receive timing are set up to ½ time of one chip. Here, assuming that the input signal D8 is timed with the receive timing in one chip, the delay signal D6 is used in first ¼ of time in the one chip to perform an arithmetic operation for an correlation operation (E) between the input signal in the early timing and the synchronization detecting code. In the subsequent ¼ of time in the one chip, an arithmetic operation for an correlation operation (P) between the input signal D8 of the receive timing and the synchronization detecting code is performed. In the last ¼ of time in the one chip, an arithmetic operation for an correlation operation (L) between the input signal of the late timing and the synchronization detecting code is performed. Multipliers or selectors perform those arithmetic operations. The results of the arithmetic operations are accumulated over a plurality of chips with respect to the receive timing and the early timing so that correlation values are computed.

The combination of FIG. 5(D) is effective in the event that the time lags of the late timing and the early timing with respect to the receive timing are set up to ¼ time of one chip. In a similar fashion to that of the combination of FIG. 5(C), it is assumed that the input signal D8 is in the receive timing in one chip of interest. In first ¼ of time in the one chip, second ¼ of time, and last ¼ of time, there are performed an arithmetic operation for an correlation operation (E) between the input signal D7 of the early timing and the synchronization detecting code, an arithmetic operation for an correlation operation (P) between the input signal D8 of the receive timing and the synchronization detecting code, and an arithmetic operation for an correlation operation (L) between the input signal D9 (the lay signal) of the late timing and the synchronization detecting code, respectively.

Multipliers or selectors perform those arithmetic operations. The results of the arithmetic operations are accumulated over a plurality of chips with respect to the receive timing, the late timing and the early timing so that correlation values are computed.

Thus, an implementation of the operation shown in FIG. 5 makes it possible to perform three correlation operations (E, P, L) on a time division basis by one DLL de-spreading circuit 18 shown in FIG. 3.

While both cases where time lags of the late timing and the early timing as to the receive timing are ½ of one chip and ¼ of one chip, there is no need to implement the both in a single de-spreading apparatus.

Figure 6:
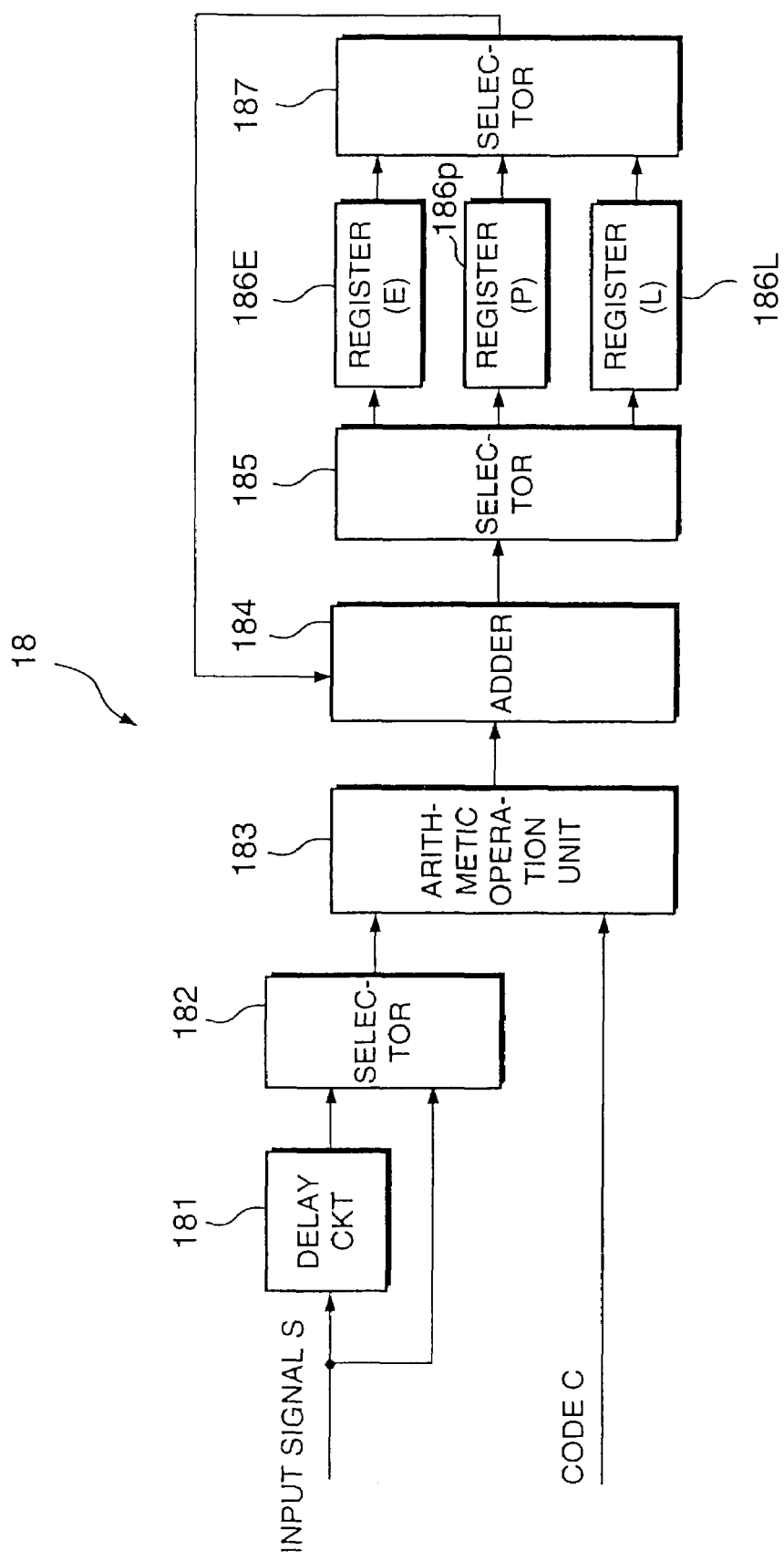
FIG. 6 is a block diagram of the DLL de-spreading circuit shown with a block in FIG. 3, with which the operations in FIG. 5 are implemented.

FIG. 6 is a block diagram of the DLL de-spreading circuit 18 shown with a block in FIG. 3, with which the operations in FIG. 5 are implemented.

A sequence of input signal S is fed directly to a selector 182, and is delayed by ¼ of one chip by a delay circuit 181 (the delayed signal is referred to as a delay signal) and then fed to the selector 182. In the event that the DLL de-spreading circuit 18 generates the late timing and the early timing having time lags by ½ of one chip with respect to the receive timing, the selector 182 is switched to output the signal shown in FIG. 5(C). In the event that the DLL de-spreading circuit 18 generates the late timing and the early timing having time lags by ¼ of one chip with respect to the receive timing, the selector 182 is switched to output the signal shown in FIG. 5(D).

An arithmetic operation unit 183 receives the signal outputted from the selector 182 and the synchronization detecting code C and performs an arithmetic operation between the input signal of the early timing and the synchronization detecting code, an arithmetic operation between the input signal of the receive timing and the synchronization detecting code, and an arithmetic operation between the input signal of the late timing and the synchronization detecting code, in timings of marks 'E', 'P' and 'L' shown in FIG. 5, respectively. A result of the arithmetic operation of the arithmetic operation unit 183 is fed to an adder 184.

Registers 186E, 186P and 186L store the initial value 0 when a first correlation operation is initiated. And thereafter, a selector 187 selects for each chip the values stored in the registers 186E, 186P and 186L in timings of marks 'E', 'P' and 'L' shown in FIG. 5, and the selected values are fed to an adder 184.

The adder 184 adds an accumulation value of an operation result in the current chip entered from the arithmetic operation unit 183 and the previous operation results entered through the selector 187, so that a result of the addition is written into the original register via the selector 185. Thus, the accumulation values of the previous operations are restored for each chip into the registers 186E, 186P and 186L. In timing wherein the correlation is terminated, the correlation value in the early timing, the correlation value in the receive timing and the correlation value in the late timing are stored in the registers 186E, 186P and 186L, respectively.

As mentioned in the explanation of the prior art, the correlation values stored in the registers 186E, 186P and 186L are fed to the timing generation circuit 15. The timing generation circuit 15 sets up a timing corresponding to the maximum correlation value as a subsequent timing, and generates timing signal suitable for the receive timing thus set up. This de-spreading apparatus operates in response to the timing signals from the timing generation circuit 15.

A comparison of the circuit scale between the three DLL de-spreading circuits 12, 13 and 14 of the de-spreading apparatus 10 in FIG. 1 and the one DLL de-spreading circuit 18 of the de-spreading apparatus 1 in FIG. 3 is shown as follows.

Figure 1:
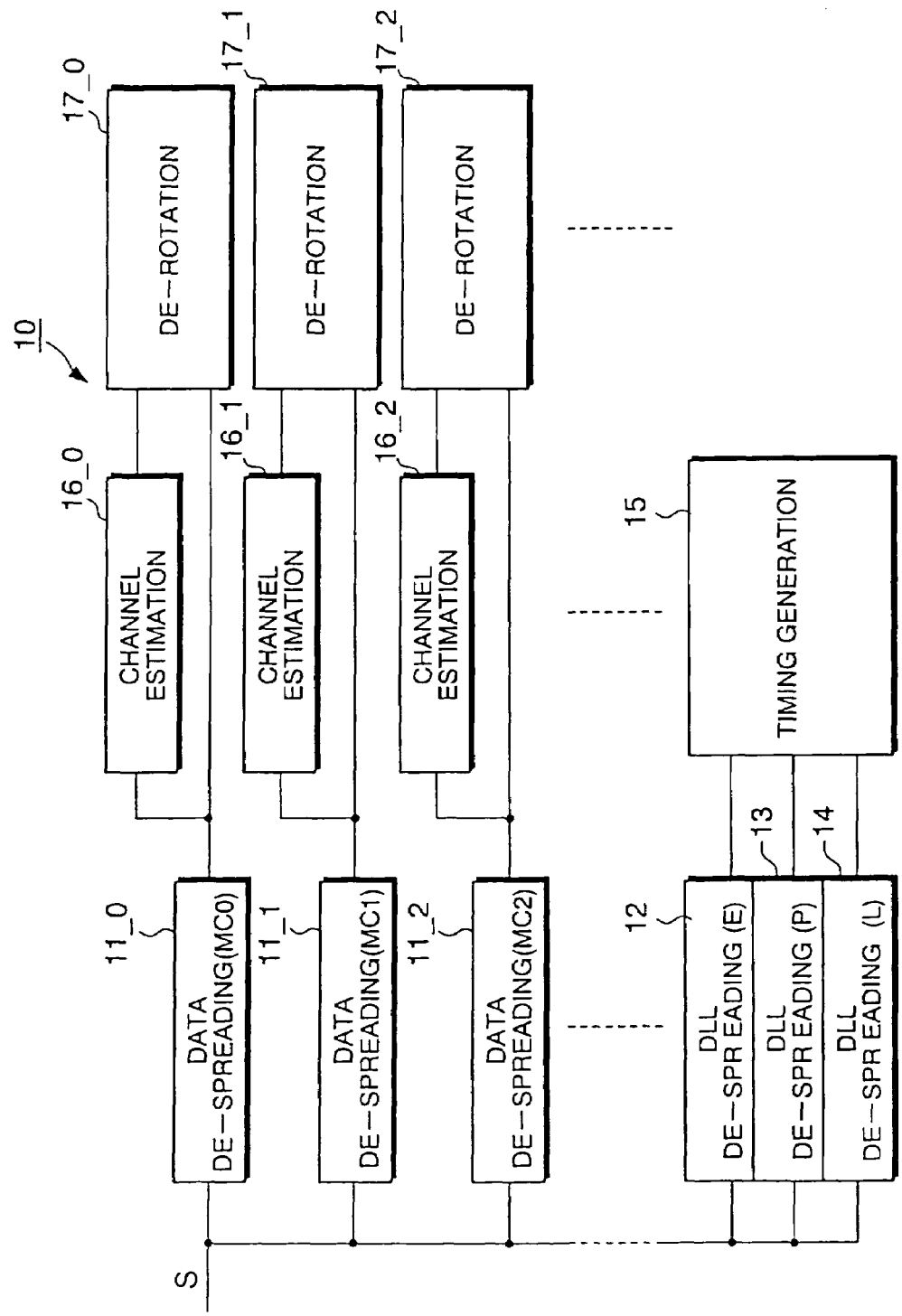
FIG. 1 is a block diagram of the conventional de-spreading apparatus.
Figure 2:
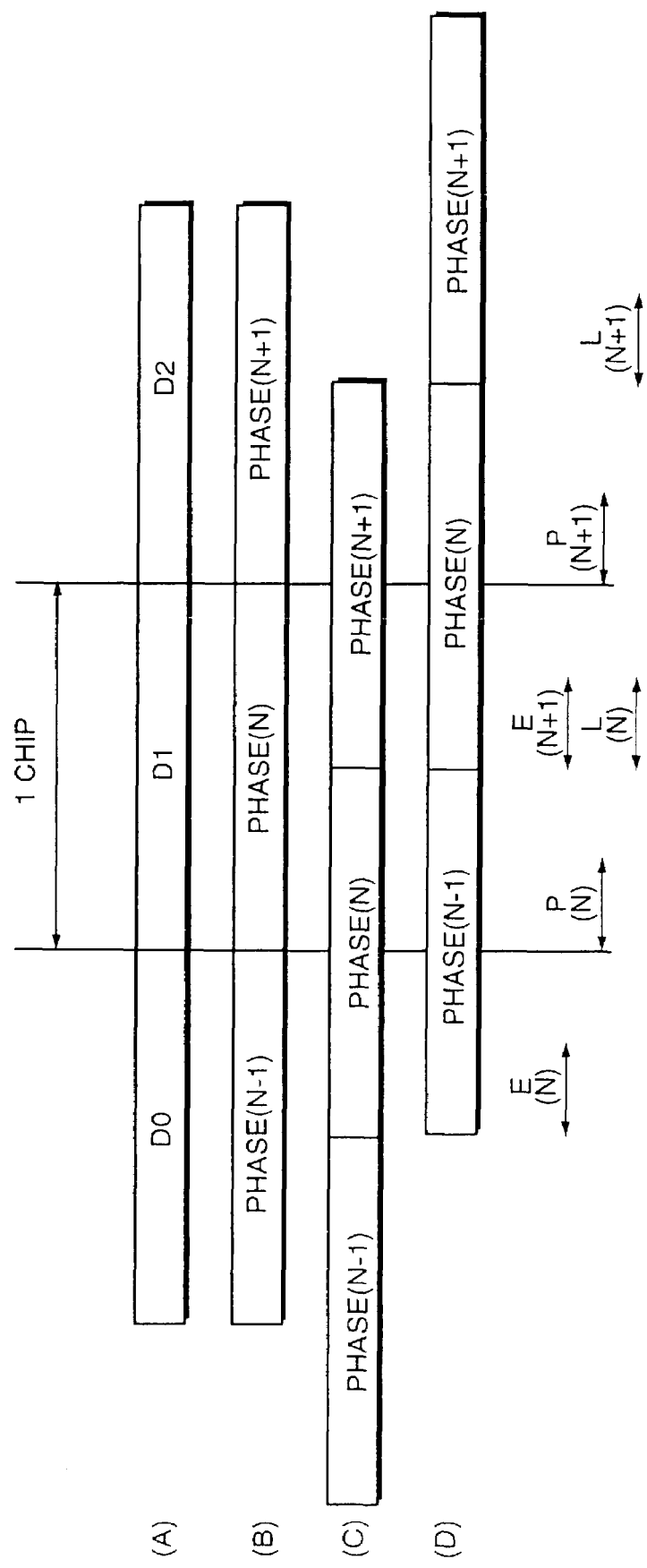
FIG. 2 is a view useful for understanding operational timings of the three DLL de-spreading circuits (E, P, L) shown in FIG. 1.

Prior art in FIG. 1:
K kilo gates×3 (E, P, L)×$N_F$ (the number of fingers)
Embodiment in FIG. 3:
K kilo gates×1 (sharing)×$N_F$ (the number of fingers)
That is, according to the embodiment, the circuit scale is reduced to ⅓. Further, the dissipation power is also greatly reduced by the correspondence.

According to the above description, the delay signals are generated by delaying the input signals. However, in view of the fact that the relation between the input signal and the synchronization detecting code is relative, it is acceptable that the synchronization detecting code is relatively earlier than the input signal and the input signals are regarded as the delayed signal with respect to the earlier synchronization detecting code.

Figure 7:
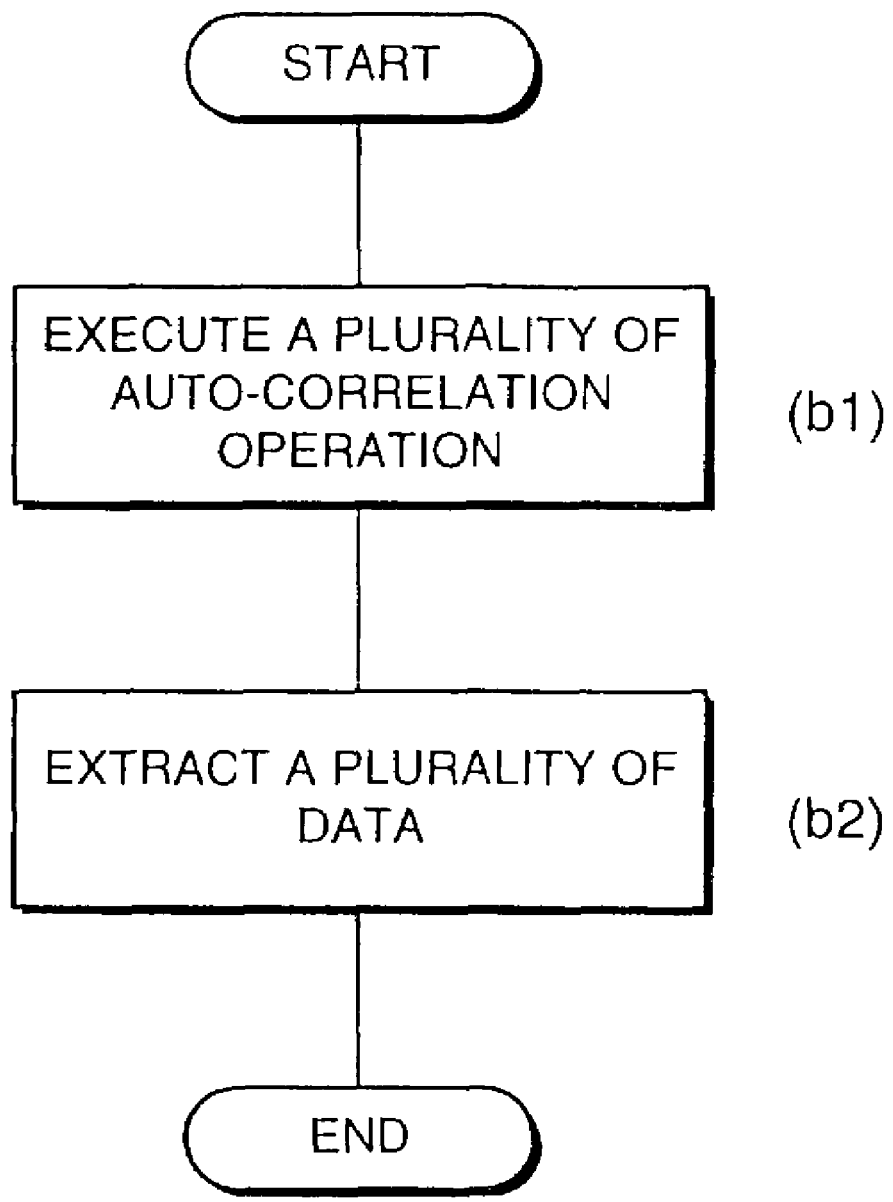
FIG. 7 is a flowchart useful for understanding a second embodiment of a de-spreading method of the present invention.

FIG. 7 is a flowchart useful for understanding a second embodiment of a de-spreading method of the present invention.

Here, unit operations that each operation is an arithmetic operation in one chip, in a plurality of correlation operations between an input signal and a plurality of sorts of data extracting codes, are performed on a time division basis and are repeatedly performed over a plurality of chips. The unit operations obtained through the repetition are accumulated in association with a plurality of sorts of data extracting codes over a plurality of continuous chips, so that a plurality of correlation operations are performed (step b1). A plurality of data, which are suitable for a plurality of sorts of data extracting codes, are extracted in accordance with the result of the plurality of correlation operations (step b2).

Figure 8:
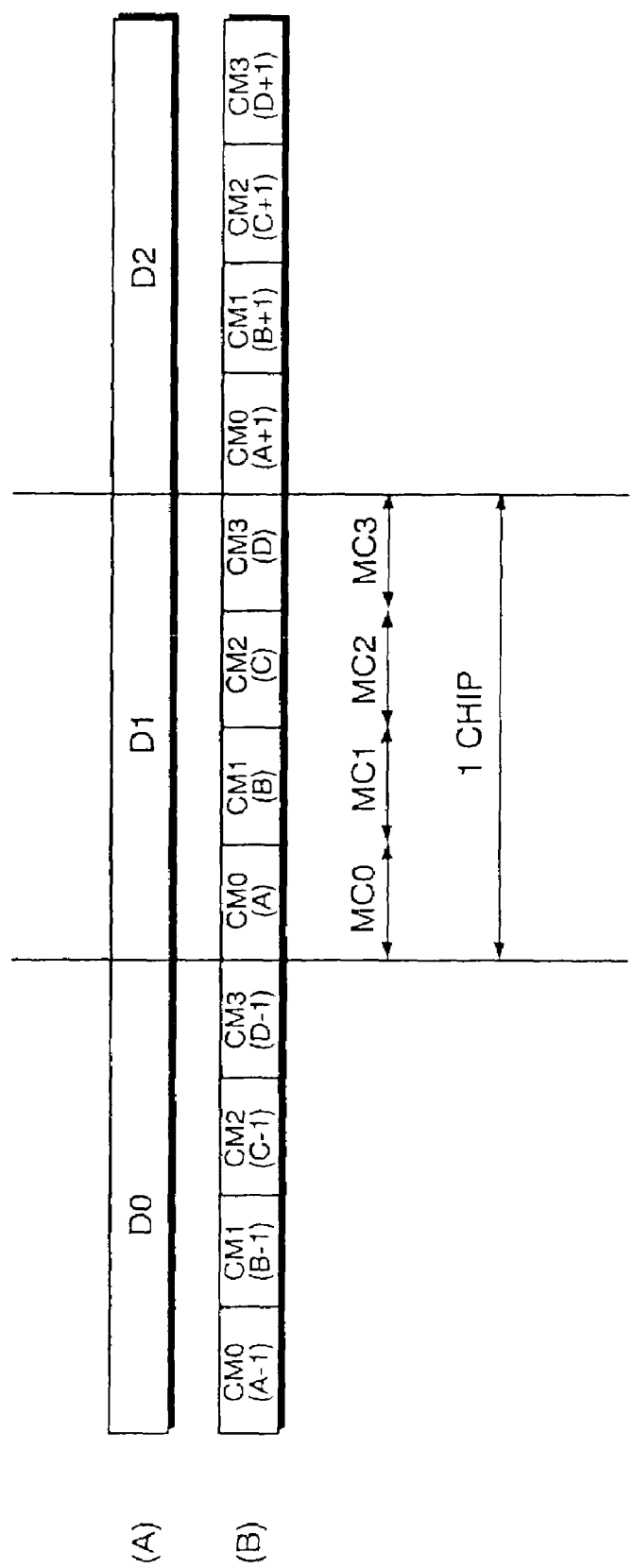
FIG. 8 is an explanatory view useful for understanding operations of the data de-spreading circuit shown with a block in FIG. 3.

FIG. 8 is an explanatory view useful for understanding operations of the data de-spreading circuit 11 shown with a block in FIG. 3. The concretely description of the step b1 of the flowchart in FIG. 7 referring to FIG. 8 follows. Assume that data is quadruply multiplexed.

FIG. 8(A) shows an input signal. Marks D0, D1, and D2 are applied for each chip in the earlier order on a time basis. The chip of interest is applied with the mark D1.

FIG. 8(B) shows a data extracting code. There are used data extracting codes CM0, CM1, CM2 and CM3, which are mutually different, in the earlier order on a time basis, wherein one chip is partitioned into ¼.

In each of times wherein one chip is divided into ¼, there are performed arithmetic operations for correlation operations between an input signal of the receive timing signal and the data extracting codes CM0, CM1, CM2 and CM3, respectively. Those arithmetic operations are accumulated over a plurality of chips on each of arithmetic operations corresponding to the data extracting codes CM0, CM1, CM2 and CM3, respectively, so that the data extracting codes CM0, CM1, CM2 and CM3 are extracted.

Figure 9:
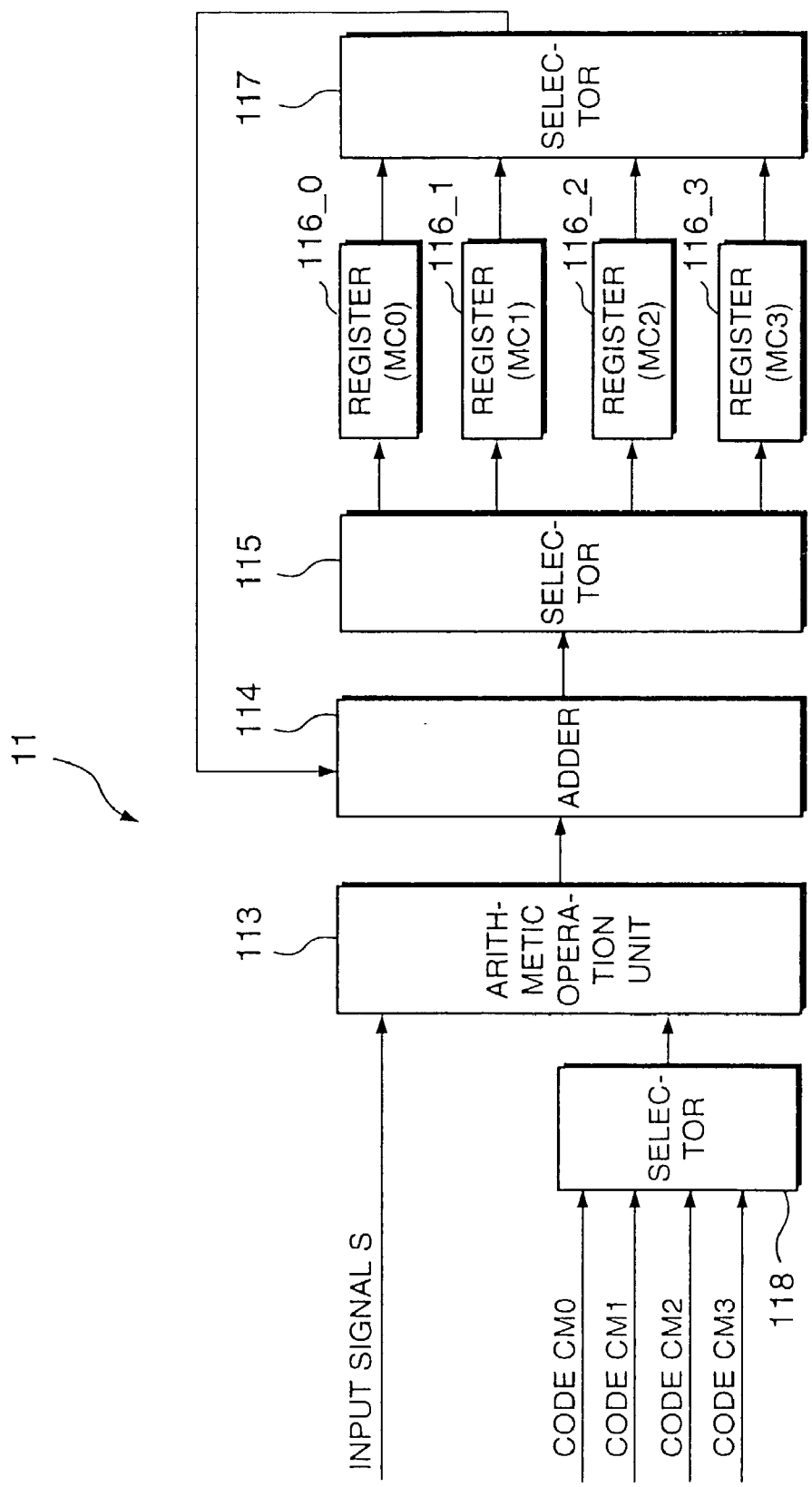
FIG. 9 is a block diagram of the data de-spreading circuit shown with a block in FIG. 3, with which the operations in FIG. 8 are implemented.

FIG. 9 is a block diagram of the data de-spreading circuit 11 shown with a block in FIG. 3, with which the operations in FIG. 8 are implemented.

An arithmetic operation unit 113, which constitutes a data de-spreading circuit 11, receives a sequence of input signals S and also data extracting codes via a selector 118. The selector 118 receives the four data extracting codes CM0, CM1, CM2 and CM3, as shown in FIG. 8, and selects the data extracting codes CM0, CM1, CM2 and CM3 circularly in the earlier order of time within one chip for each time wherein the one chip is partitioned into ¼.

The arithmetic operation unit 113 performs an operation for the correlation operation between a sequence of input signals S and the respective data extracting codes CM0, CM1, CM2 and CM3 in ¼ time of one chip.

A result of the operation by the arithmetic operation unit 113 is fed to the adder 114.

Registers 116_0, 116_1, 116_2 and 116_3 store the initial value 0 prior to the first correlation operation. Thereafter, stored values in the registers 116_0 116_1, 116_2 and 116_3 are selected by a selector 117 in timings of 'MC0', 'MC1', 'MC2' and 'MC3' respectively for each chip, and then fed to the adder 114.

The adder 114 adds an operation result as to the current chip entered from the arithmetic operation unit 113 and an accumulation value of the previous operation results entered through the selector 117, so that a result of the addition is written into the original register via the selector 115. Thus, the accumulation values of the previous operations are restored for each chip into the registers 116_0, 116_1, 116_2 and 116_3. In timing wherein the correlation is terminated, data extracted using the data extracting codes CM0, CM1, CM2 and CM3 are stored in the registers 116_0, 116_1, 116_2 and 116_3, respectively.

The data stored in the registers 116_0, 116_1, 116_2 and 116_3 are fed to a channel estimation circuit 16 and an de-rotation circuit 17 on a time division basis, so that the data are more exactly restored to their original state. The data are further more exactly restored to their original state by an error correction circuit (not illustrated).

While a case of data quadruply multiplexed has explained, in some time intervals of one chip and operation speeds of the circuit shown in FIG. 9, likely, it is possible to apply the time division scheme to, for example, a case where data is doubly multiplexed, and a case where data is hexaply multiplexed.

In the event that the data hexaply multiplexed are extracted, a comparison of a circuit scale between a case (prior art) where a data de-spreading circuit is provided for each data to be extracted and a case (embodiment) where one de-spreading circuit is used on a time basis is shown below.

(Prior art)
3 kilo gates×6 (multi code)×$N_F$ (the number of fingers)/IC chip
(Embodiment)
4 kilo gates×$N_F$ (the number of fingers)/IC chip That is, according to the embodiment, the circuit scale is reduced to 1/4.5. Further, the dissipation power is also greatly reduced by the correspondence.

Figure 10:
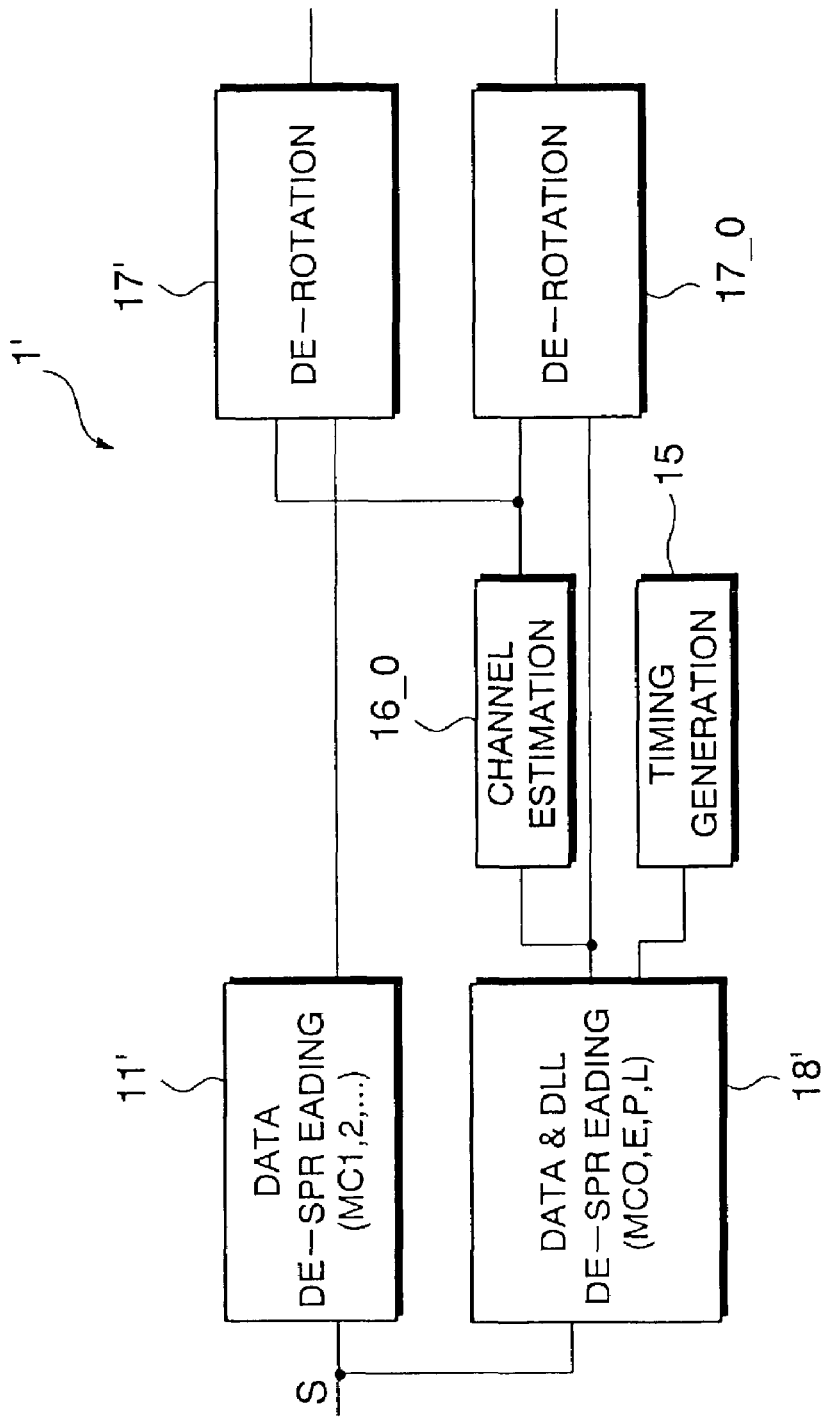
FIG. 10 is a block diagram of a second embodiment of a de-spreading apparatus of the present invention.

FIG. 10 is a block diagram of a second embodiment of a de-spreading apparatus of the present invention.

A de-spreading apparatus 1' shown in FIG. 10 comprises a data de-spreading circuit 11', a data & DLL de-spreading apparatus 18', a channel estimation circuit 16' and a de-rotation circuit 17'. The data de-spreading circuit 11' corresponds to, of a plurality of data de-spreading circuits 11_0, 11_1, 11_2, ... in the conventional de-spreading apparatus 10 shown in FIG. 1, a plurality of data de-spreading circuits 11_1, 11_2, ..., excepting the data de-spreading circuit 11_0. The data & DLL de-spreading apparatus 18' corresponds to, a combination of the data de-spreading circuit 11_0 of the plurality of data de-spreading circuits 11_0, 11_1, 11_2, ... in the conventional de-spreading apparatus 10 shown in FIG. 1, and the three DLL de-spreading circuits 12, 13 and 14 in the three de-spreading apparatuses 10 shown in FIG. 1. Further, the de-rotation circuit 17' uses on a time division basis functions of a plurality of de-rotation circuits 17_1, 17_2, ..., of a plurality of de-rotation circuits 17_0, 17_1, 11_7, ..., shown in FIG. 1, excepting the de-rotation circuit 17_0. Further, the channel estimation circuit 16_0 and the de-rotation circuit 17_0, which are connected to the data de-spreading circuit 11_0 shown in the de-spreading circuit 10 shown in FIG. 1, are connected to the data & DLL de-spreading apparatus 18' in view of the fact that in the de-spreading circuit 1' shown in FIG. 10, the function of the data de-spreading circuit 11_0 in the de-spreading circuit 10 shown in FIG. 1 is unified into the data & DLL de-spreading apparatus 18'.

The data de-spreading circuit 11' constituting the de-spreading apparatus 1' of the second embodiment shown in FIG. 10 is, as compared with the data de-spreading circuit 11 constituting the de-spreading apparatus of the first embodiment shown in FIG. 3, the same as the data de-spreading circuit 11 in FIG. 3 in structure, excepting for the matter that the number of data to be extracted is decreased by one. Accordingly, redundant explanation for the data de-spreading circuit will be omitted, and data & DLL de-spreading apparatus 18' will be described hereinafter.

Figure 11:
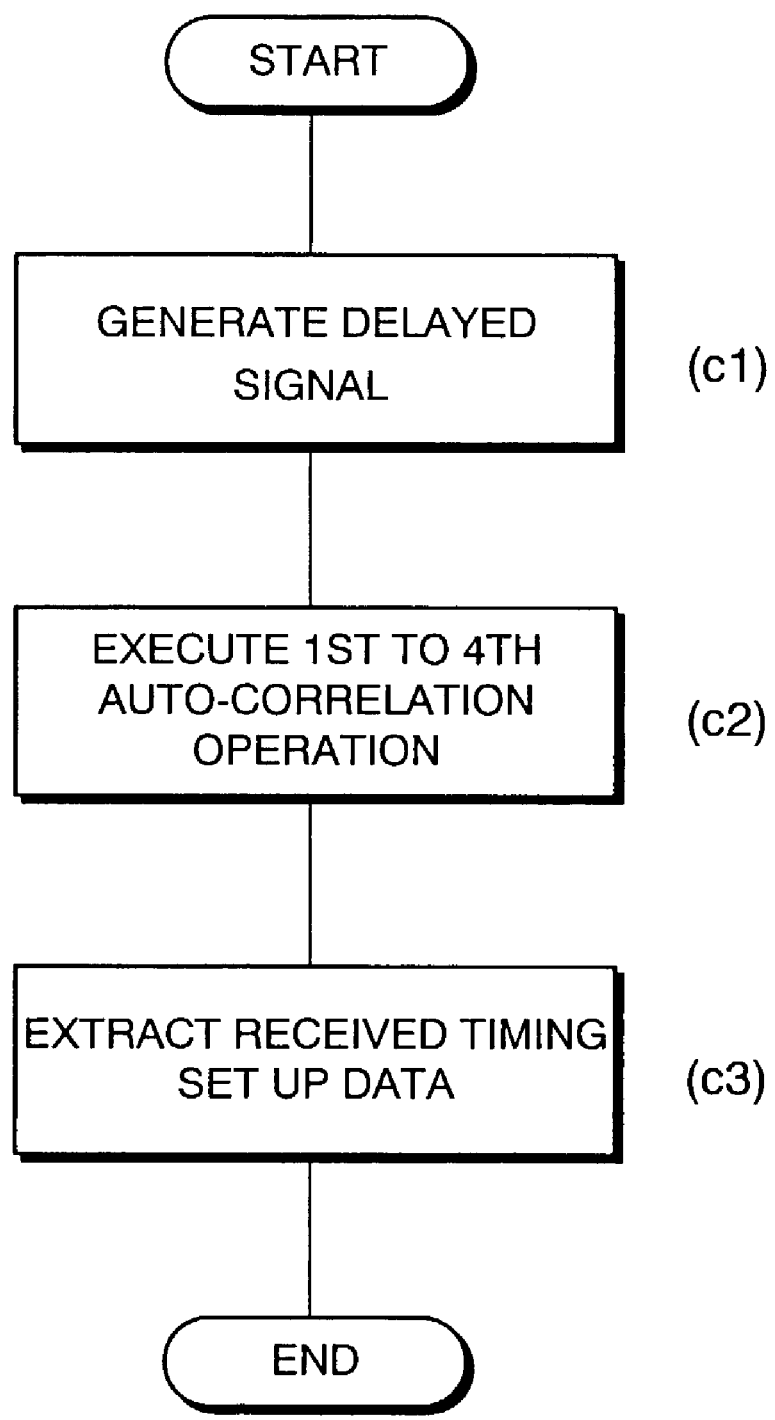
FIG. 11 is a flowchart useful for understanding a third embodiment of a de-spreading method of the present invention.

FIG. 11 is a flowchart useful for understanding a third embodiment of a de-spreading method of the present invention.

First, an input signal is relatively delayed with respect to a code so that a delayed signal is generated (step c1).

The delayed signal is generated in such a manner that the input signal is delayed by a time of 1/N of one chip where N=integer, for example, a time of ¼.

Next, there are performed a first correlation operation that is an correlation operation between an input signal in a predetermined receive timing and a synchronization detecting code, a second correlation operation that is an correlation operation between an input signal in a late timing relatively more delayed than the receive timing with respect to a synchronization detecting code and the synchronization detecting code, a third correlation operation that is an correlation operation between an input signal in an early timing relatively more advanced than the receive timing with respect to a synchronization detecting code and the synchronization detecting code, and a fourth correlation operation that is an correlation operation between an input signal in the receive timing and a data extracting code. The input signal or its delayed signal is selected in one chip on a time division basis in accordance with the respective correlation operation, and this selection is repeated over a plurality of chips.

The first to the fourth unit operations, which are arithmetic operations in a chip for the first to the third correlation operations between the input signal or its delayed signal selected in accordance with the first to the fourth correlation operations and the synchronization detecting codes, and are arithmetic operations in a chip for the fourth correlation operation between the input signal or the delayed signal and the data extracting code, are performed on a time division basis in one chip and are performed repeatedly over a plurality of chips. Results of the arithmetic operations of the first to the fourth unit operations, which are obtained through the repetition, are accumulated on the first to the fourth unit operations in a plurality of continuous chips, so that the first to the fourth correlation operations are performed (step c2).

When the first to the fourth correlation operations are performed in the manner as mentioned above, a timing of the largest correlation value among the receive timing, the late timing and the early timing, is set up as a subsequent receive timing in accordance with the results of the first to the third correlation operations, and data suitable for the data extracting code is extracted (step c3).

Figure 12:
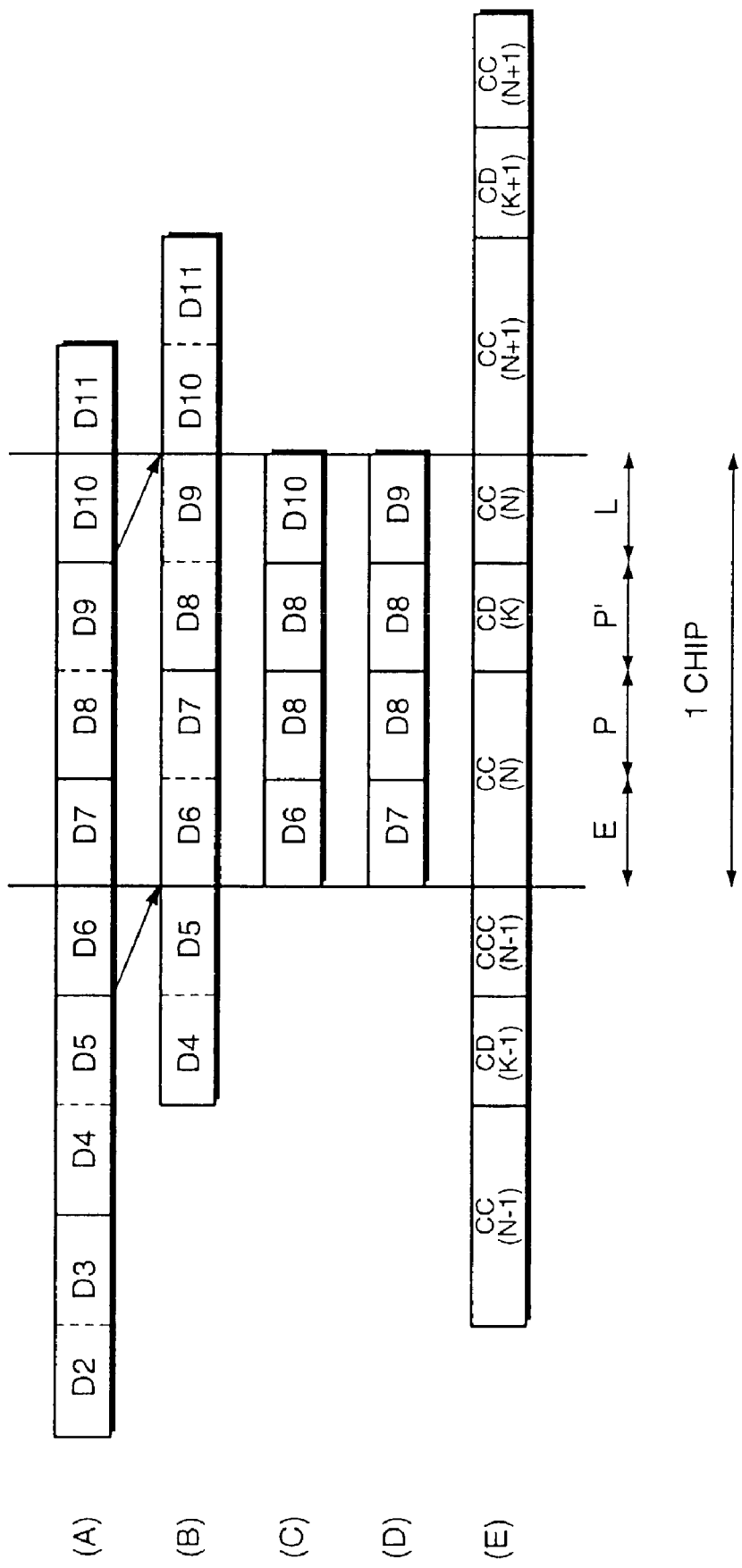
FIG. 12 is an explanatory view useful for understanding operations of the de-spreading circuit shown with a block in FIG. 10.

FIG. 12 is an explanatory view useful for understanding operations of the data & DLL de-spreading circuit 18' shown with a block in FIG. 10. The step c2 of the flowchart of FIG. 11 will be concretely explained referring to FIG. 12.

FIG. 12(A) shows a sequence of input signals. For the input signal shown in FIG. 12(A), marks D2, D3 ...... D11 are applied at intervals of time wherein one chip is partitioned into ¼, in the earlier order in time. Marks D7, D8, D9 and D10 are applied for one chip of interest.

FIG. 12(B) shows a delayed signal in which the input signal shown in FIG. 12(A) is delayed by ¼ of one chip.

FIG. 12(C) and FIG. 12(D) show a combination of the input signal shown in FIG. 12(A) and the delayed signal in FIG. 12(B).

FIG. 12(C) shows a combination of signals in which first ¼ time in one chip of interest is the delayed signal D6 in FIG. 12(B), second ¼ time is the input signal D8 in FIG. 12(A), third ¼ time is the delay signal D8 in FIG. 12(B), and fourth ¼ time is the input signal D10 in FIG. 12(A).

FIG. 12(D) shows a combination of signals in which first ¼ time in one chip of interest is the input signal D7 in FIG. 12(A), second ¼ time is the input signal D8 in FIG. 12(A), third ¼ time is the delayed signal D8, and fourth ¼ time is the delayed signal D9 in FIG. 12(B).

As mentioned in the description of the Background Art, the correlation operations for synchronization detection needs an correlation operation between the input signal in the present receive timing and the synchronization detecting code, an correlation operation between the input signal in a late timing relatively more delayed than the present receive timing with respect to the synchronization detecting code and the synchronization detecting code, and an correlation operation between the input signal in an early timing relatively more advanced than the present receive timing with respect to the synchronization detecting code and the synchronization detecting code. Regarding the time lags of the late timing and the early timing with respect to the receive timing, those time lags may be set up to ½ time of one chip, or ¼ time of one chip in accordance with a design concept and the like.

The combination of FIG. 12(C) is effective in the event that the time lags of the late timing and the early timing with respect to the receive timing are set up to ½ time of one chip. Here, assuming that the input signal D8 is in the receive timing in one chip of interest, the delayed signal D6 is used in first ¼ of time in the one chip to perform an arithmetic operation for an correlation operation (E) between the input signal of the early timing and the synchronization detecting code. In the subsequent ¼ of time in the one chip, there is performed an arithmetic operation for an correlation operation (P) between the input signal DS of the receive timing and the synchronization detecting code. In the third ¼ of time in the one chip, there is performed an arithmetic operation for an correlation operation between the input signal of the receive timing and the data extracting code. In the last ¼ of time in the one chip, there is performed an arithmetic operation for an correlation operation (L) between the input signal of the late timing and the synchronization detecting code. Multipliers or selectors perform those arithmetic operations. The results of the arithmetic operations are accumulated over a plurality of chips so that correlation values are computed.

The combination of FIG. 12(D) is effective in the event that the time lags of the late timing and the early timing with respect to the receive timing are set up to ¼ time of one chip. In a similar fashion to that of the combination of FIG. 12(C), it is assumed that the input signal D8 is in the receive timing in one chip of interest. In first ¼ of time in the one chip, second ¼ of time, third ¼ of time, and last ¼ of time, there are performed an arithmetic operation for an correlation operation (E) between the input signal D7 of the early timing and the synchronization detecting code, an arithmetic operation for an correlation operation (P) between the input signal D8 of the receive timing and the synchronization detecting code, an arithmetic operation for an correlation operation between the input signal D8 of the receive timing and the data extracting code, and an arithmetic operation for an correlation operation (L) between the input signal D9 (the delayed signal) of the late timing and the synchronization detecting code, respectively. Multipliers or selectors perform those arithmetic operations. The results of the arithmetic operations are accumulated over a plurality of chips with respect to the receive timing, the late timing and the early timing so that four correlation values are computed.

Thus, an implementation of the operation shown in FIG. 12 makes it possible to perform four correlation operations on a time division basis by one data & DLL de-spreading circuit 18' shown in FIG. 10.

While there is shown here both cases where time lags of the late timing and the early timing as to the receive timing are ½ of one chip and ¼ of one chip, there is no need to implement the both in a single de-spreading apparatus.

Figure 13:
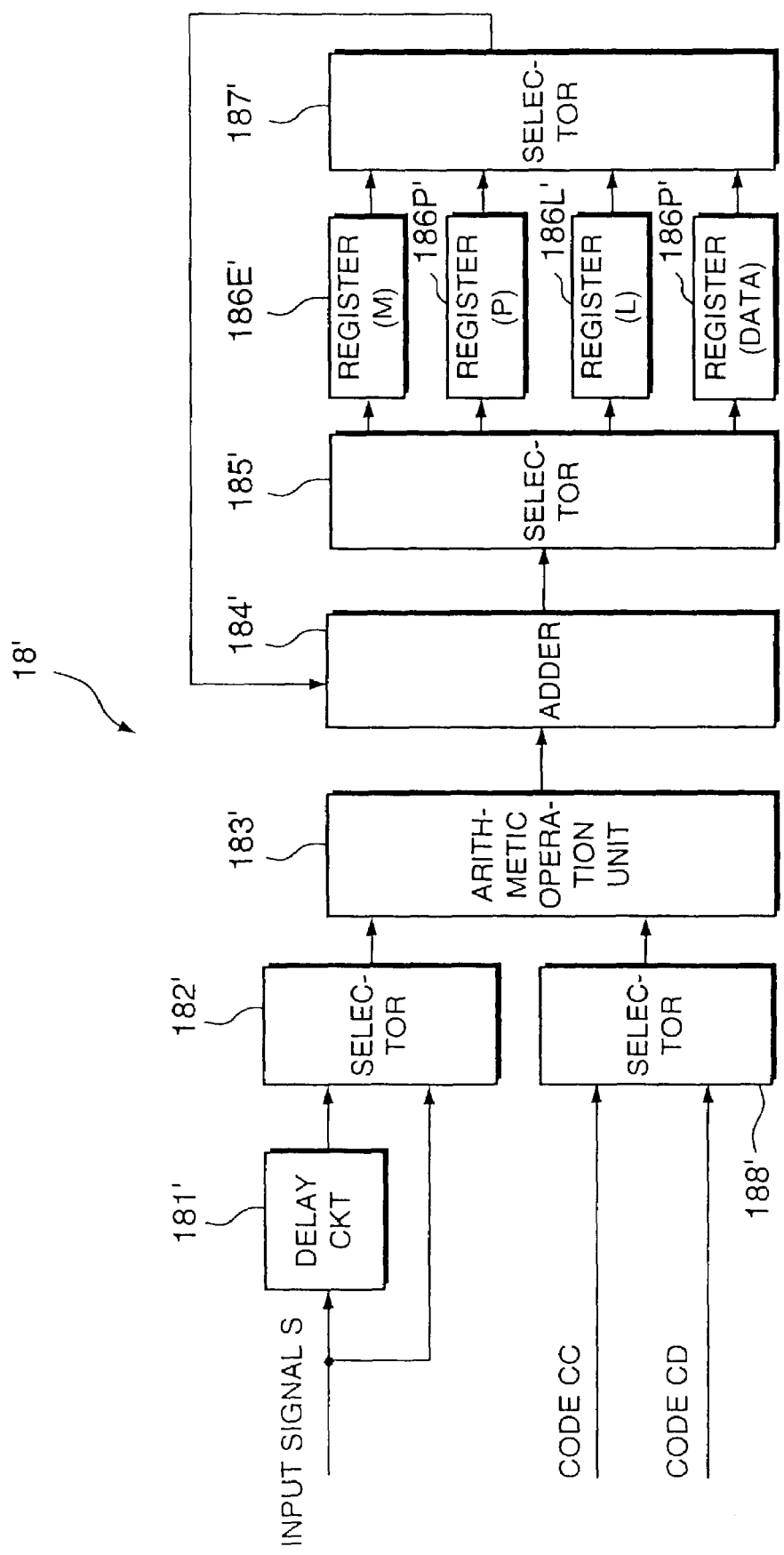
FIG. 13 is a block diagram of the de-spreading circuit shown with a block in FIG. 10, with which the operations in FIG. 12 are implemented.

FIG. 13 is a block diagram of the data & DLL de-spreading circuit 18' shown with a block in FIG. 10, with which the operations in FIG. 12 are implemented.

A sequence of input signal S is fed directly to a selector 182', and is delayed by ¼ of one chip by a delay circuit 181 (the signal is referred to as a delayed signal) and then fed to the selector 182'. In the event that the de-spreading circuit 18' generates the late timing and the early timing having time lags by ½ of one chip with respect to the receive timing, the selector 182' is switched to output the signal shown in FIG. 12(C). In the event that the de-spreading circuit 18' generates the late timing and the early timing having time lags by ¼ of one chip with respect to the receive timing, the selector 182' is switched to output the signal shown in FIG. 12(D).

Another selector 188' receives both the synchronization detecting code CC and the data extracting code CD, and as shown in FIG. 12 selects the synchronization detecting code in time of ¼ of the first, the second and the last of the one chip, and the data extracting code CD in time of ¼ of the third of the one chip.

An arithmetic operation unit 183' receives the signal outputted from the selector 182' and the code outputted from the selector 188' and performs an arithmetic operation between the input signal of the early timing and the synchronization detecting code, an arithmetic operation between the input signal of the receive timing and the synchronization detecting code, an arithmetic operation between the input signal of the receive timing and the data extracting code, and an arithmetic operation between the input signal of the late timing and the synchronization detecting code, in timings of marks 'E', 'P', 'P'' and 'L' shown in FIG. 12, respectively. A result of the arithmetic operation of the arithmetic operation unit 183' is fed to an adder 184'.

Registers 186E', 186P', 186L' and 186D' store the initial value 0 when a first correlation operation is initiated. And thereafter, a selector 187' selects for each timing the values stored in the registers 186E', 186P', 186L' and 186D' in timings of marks 'E', 'P', 'L' and 'P' shown in FIG. 12, and the selected values are fed to an adder 184'.

The adder 184' adds an operation result as to the current chip entered from the arithmetic operation unit 183' and an accumulation value of the previous operation results entered through the selector 187', so that a result of the addition is written into the original register via the selector 185'. Thus, the accumulation values of the previous operations are restored for each chip into the registers 186E', 186P', 186L' and 186D'. In timing wherein the correlation is terminated, the correlation value as to the early timing, the correlation value as to the receive timing, the correlation value as to the late timing, and the correlation value representative of extracting data as to the receive timing are stored in the registers 186E', 186P', 186L' and 186D', respectively.

As mentioned in the explanation of the prior art, the correlation values stored in the three registers 186E', 186P' and 186L' of the registers 186E', 186P', 186L' and 186D' are fed to the timing generation circuit 15 (cf. FIG. 10). The timing generation circuit 15 sets up a timing corresponding to the maximum value of the correlation values as a subsequent timing, and generates a timing signal suitable for the receive timing thus set up. This de-spreading apparatus operates in response to the timing signal from the timing generation circuit 15.

Further, as mentioned in the explanation of the prior art, the correlation value (data) stored in the remaining register 186D' of the registers 186E', 186P', 186L' and 186D' is fed to the channel estimation circuit 16_0 and the de-rotation circuit 17_0 as shown in FIG. 10, so that the data is restored to the exact data, and further, the data is restored to the exact data by an error correction circuit (not illustrated).

A comparison result in a circuit scale between the four de-spreading circuits 11, 12, 13 and 14 of the de-spreading apparatus 10 in FIG. 1 and the one data & DLL de-spreading circuit 18' of the de-spreading apparatus 1' in FIG. 10 is shown as follows.

Prior art in FIG. 1:

(K kilo gates+M kilo gates)×$N_F$ (the number of fingers), where K≅M

Embodiment in FIG. 10:

K kilo gates×$N_F$ (the number of fingers)

That is, according to the embodiment, the circuit scale is reduced to ½. Further, the dissipation power is also greatly reduced by the correspondence.

According to the embodiments shown in FIG. 10 to FIG. 13, the input signal is delayed to generate its delayed signal. However, in view of the fact that the relation between the input signal and the synchronization detecting code or the data extracting code is relative, it is acceptable that the synchronization detecting code or the data extracting code is relatively advanced with respect to the input signal and the input signal is regarded as the delayed signal with respect to the advanced synchronization detecting code or the data extracting code.

What is claimed is:

1. A de-spreading method in which a correlation operation between a first selected signals time-sequentially inputted and a predetermined code is performed so that data suitable for the code is extracted from the input signals, the de-spreading method comprising:

generating a delayed signal by delaying an input signal relatively with respect to a code;

selecting the input signal or the delayed signal in one chip on a time division basis in accordance with a first correlation operation that is a correlation operation between an input signal in a predetermined receive timing and a synchronization detecting code, a second correlation operation that is a correlation operation between an a second selected signal in a late timing relatively more delayed than the receive timing with respect to the synchronization detecting code and the synchronization detecting code, a third correlation operation that is a correlation operation between a third selected signal in an early timing relatively more advanced than the receive timing with respect to the synchronization detecting code and the synchronization detecting code, and a fourth correlation operation that is a correlation operation between a fourth selected signal in the receive timing and a data extracting code, and repeating the selection over a plurality of chips;

performing the first to the fourth correlation operations, wherein first to fourth unit operations, which are arithmetic operations in a chip for the first to the third correlation operations between the input signal or the delayed signal selected in accordance with the first to the fourth correlation operations and the synchronization detecting code, and are arithmetic operations in a chip for the fourth correlation operation between the input signal or the delayed signal and the data extracting code, are performed on a time division basis in one chip and are performed repeatedly over a plurality of chips, and results of the arithmetic operations of the first to the fourth unit operations, which are obtained through the repetition, are accumulated on the first to the fourth unit operations in a plurality of continuous chips; and setting the timing of the largest correlation value among the receive timing, the late timing and the early timing, as the subsequent receive timing in accordance with the results of the first to the third correlation operations, and extracting data suitable for the data extracting code.

2. A de-spreading apparatus in which a correlation operation between input signals time-sequentially inputted and predetermined codes is performed so that data suitable for the code is extracted from the input signals, said de-spreading apparatus comprising:

a correlation operating unit for performing a first correlation operation that is a correlation operation between a first selected signal in a predetermined receive timing and a synchronization detecting code, a second correlation operation that is a correlation operation between a second selected signal in a late timing relatively more delayed than the receive timing with respect to the synchronization detecting code and the synchronization detecting code, and a third correlation operation that is a correlation operation between a third selected signal in an early timing relatively more advanced than the receive timing with respect to the synchronization detecting code and the synchronization detecting code; and a timing generation section for setting up the timing of the largest correlation value among the receive timing, the late timing and the early timing, as the subsequent receive timing in accordance with the results of the first to the third correlation operations in said correlation operating unit and generating timing signals suitable for the receive timing, wherein said correlation operating unit comprises:

a delay circuit for delaying an input signal relatively with respect to the synchronization detecting code to generate a delayed signal, and a correlation circuit for performing the first to the third correlation operations between the input signal or the delayed signal and the synchronization detecting code on a time division basis, the signals are selected in accordance with the first to the third correlation operations, wherein said correlation circuit comprises:

an arithmetic operation unit for performing the first to the third unit operations that are arithmetic operations for the first to the third correlation operations between the input signal or the delayed signal and the synchronization detecting code, on a time division basis in one chip as a unit of time, the signals are selected in accordance with the first to the third correlation operations;

first to third registers for storing results still in progress of the first to the third correlation operations, respectively; and an adder for adding operational results of the first to the third unit operations to stored values of the first to the third registers, and restoring results of the arithmetic operations into the first to the third registers respectively on a time division basis in the one chip, so as to obtain accumulation of the operational results of the first to third unit operations over a plurality of continuous chips.

3. A de-spreading apparatus in which a correlation operation between input signals time-sequentially inputted and a predetermined code is performed so that data suitable for the code is extracted from the input signals, said de-spreading apparatus comprising:

a correlation operating unit for performing a first correlation operation that is a correlation operation between a first selected signal in a predetermined receive timing and a synchronization detecting code, a second correlation operation that is a correlation operation between a second selected signal in a late timing relatively more delayed than the receive timing with respect to the synchronization detecting code and the synchronization detecting code, a third correlation operation that is a correlation operation between a third selected signal in an early timing relatively more advanced than the receive timing with respect to the synchronization detecting code and the synchronization detecting code, and a fourth correlation operation that is a correlation operation between a fourth selected signal in the receive timing and a data extracting code; and a timing generation section for setting up the timing of the largest correlation value among the receive timing, the late timing and the early timing, as the subsequent receive timing in accordance with the results of the first to the third correlation operations, of the first to the fourth correlation operations in said correlation operating unit, and generating timing signals suitable for the receive timing, wherein said correlation operating unit comprises:

a delay circuit for delaying an input signal relatively with respect to the synchronization detecting code and the data extracting code to generate a delayed signal, and a correlation circuit for performing on a time division basis the first to the fourth correlation operations, wherein the first to the third correlation operations are performed between the input signal or the delayed signal selected in accordance with the first to the fourth correlation operations and the synchronization detecting code, and the fourth correlation operation are performed between the input signal or the delayed signal and the data extracting codes.

4. A de-spreading apparatus according to claim 3, wherein said correlation circuit comprises:

an arithmetic operation unit for performing the first to the fourth operations, which are arithmetic operations in a chip for the first to the third correlation operations between the input signal or the delayed signal selected in accordance with the first to the fourth correlation operation and the synchronization detecting code, and an arithmetic operation in a chip for the fourth correlation operation between the input signal or the delayed signal and the data extracting code, on a time division basis in one chip as a unit of time;

first to fourth registers for storing results still in progress of the first to the fourth correlation operations, respectively; and an adder for adding operational results of the first to the fourth operations to stored values of the first to the fourth registers, and restoring results of the arithmetic operations into the first to the fourth registers respectively, on a time division basis in the one chip, so as to obtain accumulation of the operational results of the first to the fourth operations over a plurality of continuous chips.

5. A de-spreading apparatus in which a correlation operation between input signals time-sequentially inputted and predetermined codes is performed so that data suitable for the code is extracted from the input signals, said de-spreading apparatus comprising:

a correlation operating unit for performing a first correlation operation that is a correlation operation between a first selected signal in a predetermined receive timing and a synchronization detecting code, a second correlation operation that is a correlation operation between a second selected signal in a late timing relatively more delayed than the receive timing with respect to the synchronization detecting code and the synchronization detecting code, and a third correlation operation that is a correlation operation between a third selected signal in an early timing relatively more advanced than the receive timing with respect to the synchronization detecting code and the synchronization detecting code; and a timing generation section for setting up the timing of the largest correlation value among the receive timing, the late timing and the early timing, as the subsequent receive timing in accordance with the results of the first to the third correlation operations in said correlation operating unit and generating timing signals suitable for the receive timing, wherein said correlation operating unit comprises:

a delay circuit for delaying the input signal relatively with respect to the synchronization detecting code to generate a delayed signal, wherein said delay circuit delays the input signal by a time of 1/N of one chip where N=integer, and a correlation circuit for performing the first to the third correlation operations between the input signal or the delayed signal and the synchronization detecting code on a time division basis, the signals are selected in accordance with the first to the third correlation operations.

6. A de-spreading apparatus in which a correlation operation between input signals time-sequentially inputted and a predetermined code is performed so that data suitable for the code is extracted from the input signals, said de-spreading apparatus comprising:

a correlation operating unit for performing on a time division basis a plurality of correlation operations between the input signals and a plurality of sorts of data extracting codes, and extracting a plurality of sorts of data, wherein said correlation operating unit comprises:

an arithmetic operation unit for performing a plurality of correlation operations between the input signal and a plurality of data extracting codes, on a time division basis in one chip as a unit of time;

a plurality of registers for storing results still in progress of the plurality of correlation operations, respectively; and an adder for adding operational results of the plurality of operations to stored values of the plurality of registers, and restoring results of the arithmetic operations into the plurality of registers respectively on a time division basis in the one chip, so as to obtain accumulation of the operational results of the plurality of operations over a plurality of continuous chips.

7. A de-spreading method according to claim 1, wherein the delayed signal is generated in such a manner that the input signal is delayed by a time of 1/N of one chip where N=integer.

8. A de-spreading apparatus according to claim 3, wherein said delay circuit delays the input signal by a time of 1/N of one chip where N=integer.

* * * * *